(12) United States Patent
Matsumura et al.

(10) Patent No.: US 7,798,302 B2
(45) Date of Patent: Sep. 21, 2010

(54) ELECTROMAGNETIC CLUTCH

(75) Inventors: Tomonori Matsumura, Isesaki (JP); Hirokazu Ichinose, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 179 days.

(21) Appl. No.: 11/391,490

(22) Filed: Mar. 29, 2006

(65) Prior Publication Data

US 2006/0219514 A1 Oct. 5, 2006

(30) Foreign Application Priority Data

Mar. 29, 2005 (JP) ............................. 2005-095963

(51) Int. Cl.
*F16D 27/02* (2006.01)
(52) U.S. Cl. ............................. 192/84.94; 192/84.961; 192/200
(58) Field of Classification Search ............ 192/84.961, 192/84.94, 200
See application file for complete search history.

(56) References Cited

U.S. PATENT DOCUMENTS

| | | | |
|---|---|---|---|
| 3,310,141 A * | 3/1967 | Smirl | 192/84.94 |
| 4,460,167 A * | 7/1984 | Silvis et al. | 267/42 |
| 4,972,932 A | 11/1990 | Nakamura et al. | |
| 5,080,213 A * | 1/1992 | Sunaga | 192/84.94 |
| 5,642,798 A | 7/1997 | Muirhead et al. | |
| 6,702,082 B2 * | 3/2004 | Dorfler et al. | 192/70.18 |
| 7,178,653 B2 * | 2/2007 | Ichinose et al. | 192/84.94 |

FOREIGN PATENT DOCUMENTS

| | | |
|---|---|---|
| EP | 0370624 A1 | 5/1990 |
| EP | 1510714 A2 | 3/2005 |
| FR | 2813931 A1 | 3/2002 |
| JP | S55-014369 A | 1/1980 |
| JP | 35830 | 7/1995 |
| JP | 2001-304297 A | 10/2001 |

OTHER PUBLICATIONS

French Patent Office, French Office Action issued in corresponding French Application No. 0602637, dated Nov. 27, 2008.

* cited by examiner

*Primary Examiner*—David D Le
*Assistant Examiner*—Derek D Knight
(74) *Attorney, Agent, or Firm*—Baker Botts, LLP

(57) ABSTRACT

In this electromagnetic clutch, a compressive force is generated in a plate spring when an armature plate is contact with a first rotor. Therefore, a force in the direction away from the first rotor acts on a first bent portion of a plate spring. However, an extension portion of a second rotor is capable of abutting to the first bent portion from the direction opposite to the first rotor. So a stress generated in the first bent portion is dispersed to the extension portion.

4 Claims, 8 Drawing Sheets

ELECTROMAGNETIC CLUTCH

BACKGROUND OF THE INVENTION (i) Field of the Invention

The present invention relates to an electromagnetic clutch for transmitting power from a power source of a vehicle to a compressor of an air conditioner for vehicle, for example.

(ii) Description of the Related Art

A generally known electromagnetic clutch includes a first rotor rotated by power from outside, an armature plate arranged oppositely to one end face of the first rotor in the axial direction, an electromagnetic coil for attracting the armature plate to the first rotor side, a second rotor for transmitting a turning force transmitted from the armature plate side to a driven shaft on a driven device, and a plurality of plate springs in which one end side is connected to the armature plate and the other end side is connected to the second rotor for transmitting the turning force from the armature plate to the second rotor and for urging the armature plate in the direction away from the first rotor.

In the above electromagnetic clutch, the armature plate and the first rotor are connected only with a magnetic force of the electromagnetic coil. Therefore, it is necessary to enlarge the electromagnetic coil so as to increase a torque capacity which can be transmitted between the first rotor and the armature plate. That is, it is not possible to reduce weight and power consumption of the electromagnetic clutch.

On the other hand, an electromagnetic clutch for which the above point can be improved is provided with a first rotor similar to the above, not shown, an electromagnetic coil, not shown, an armature plate 61, a second rotor 62, and a plurality of plate springs 63 in which one end is connected to the armature plate 61 and the other end is connected to the second rotor for transmitting the turning force from the armature plate 61 to the second rotor 62 and for urging the armature plate 61 away from the first rotor (See FIGS. 13 to 15). To each of the plate springs 63, a compression force is applied between its one end and the other end when the turning force is to be transmitted. An inclined portion 63a is provided on the plate spring 63, which is formed by bending a part thereof to the first rotor side. A part of the compression force applied to the plate spring 63 acts as a force for pressing the armature plate 61 onto the first rotor by the inclined portion 63a.

However, in the latter electromagnetic clutch, a bent portion 63b of the plate spring 63 is deformed in the direction away from the first rotor by reaction of the pressing when the compression force is applied to the plate spring 63 and the armature plate 61 is pressed onto the first rotor. Since a stress is concentrated to the bent portion 63b by this, the stress needs to be alleviated.

SUMMARY OF THE INVENTION

An object of the present invention is to provide an electromagnetic clutch which has a plate spring capable of pressing an armature plate onto a first rotor side while transmitting a turning force from the armature plate to a second rotor and can alleviate a stress concentrating on a bent portion of a plate spring.

In order to achieve the above object, in the present invention, an electromagnetic clutch for transmitting a turning force of a first rotor rotated by power from outside to a rotational axis of a driven device is provided with an armature plate arranged oppositely to the first rotor in the axial direction, an electromagnetic coil for attracting the armature plate to the first rotor side, a second rotor for transmitting the turning force transmitted from the armature plate side to the rotational axis of the driven device, a plate spring in which one end side is connected to the second rotor and the other end side is connected to the armature plate, an inclined portion which is formed by bending a part of the plate spring to the first rotor side, and the inclined portion applies a pressing force to the armature plate directing toward the first rotor when the turning force is transmitted from the armature plate to the second rotor through the plate spring, and a contact portion which is capable of abutting to said part of the plate spring from the direction opposite to the first rotor.

By this, said part of the plate spring is a bent portion, and the contact portion is capable of contacting with the bent portion of the plate spring from the direction opposite to the first rotor. Therefore, even if a force in the direction away from the first rotor acts on the bent portion by reaction of the pressing force, the stress generated in the bent portion by the contact with the contact portion is dispersed to the contact portion side. That is, the stress concentrating on the bent portion is alleviated. Thus, no deformation or strength drop is generated in the plate spring even after use for a long time, and durability of the plate spring can be improved. Also, even if a force in the direction away from the first rotor acts on the bent portion by the reaction of the pressing force, deformation of the bent portion in the above direction is regulated by the contact portion. Therefore, the pressing force is applied to the armature plate without being decreased by deformation of the bent portion.

Moreover, in the present invention, an electromagnetic clutch for transmitting a turning force of a first rotor rotated by power from outside to a rotational axis of a driven device is provided with an armature plate arranged oppositely to the first rotor in the axial direction, an electromagnetic coil for attracting the armature plate to the first rotor side, a second rotor for transmitting the turning force transmitted from the armature plate side to the rotational axis of the driven device, a plate spring in which one end side is connected to the second rotor and the other end side is connected to the armature plate, and the plate spring in which a part has a sectional area larger than that of the other part, and an inclined portion which is formed by bending said part of the plate spring to the first rotor side, and the inclined portion applies a pressing force to the armature plate directing toward the first rotor when the turning force is transmitted from the armature plate to the second rotor through the plate spring.

By this, said part of the plate spring is a bent portion, and the bent portion has a sectional area larger than the other part of the plate spring. Therefore, even if a force in the direction away from the first rotor acts on the bent portion by the reaction of the pressing force, a stress generated in the bent portion is dispersed by the larger sectional area. That is, the stress concentrating on the bent portion is alleviated. Thus, no deformation or strength drop is generated in the plate spring even after use for a long time, and durability of the plate spring can be improved.

Moreover, in the present invention, an electromagnetic clutch for transmitting a turning force of a first rotor rotated by power from outside to a rotational axis of a driven device is provided with an armature plate arranged oppositely to the first rotor in the axial direction, an electromagnetic coil for attracting the armature plate to the first rotor side, a second rotor for transmitting the turning force transmitted from the armature plate side to the rotational axis of the driven device, a plate spring in which one end side is connected to the second rotor and the other end side is connected to the armature plate, an inclined portion which is formed by bending a part of the plate spring to the first rotor side, and the inclined portion applies a pressing force to the armature plate directing toward the first rotor when the turning force is transmitted from the armature plate to the second rotor through the plate spring, and an other plate spring overlapping said plate spring.

By this, said part of the plate spring is a bent portion and the other plate spring overlaps the plate spring. Therefore, even if a force in the direction away from the first rotor acts on the bent portion by the reaction of the pressing force, a stress generated in the bent portion of the plate spring is dispersed by another plate spring. That is, the stress concentrating on the bent portion is alleviated. Therefore, no deformation or strength drop is generated in the plate spring even after use for a long time, and durability of the plate spring can be improved.

Furthermore, in the present invention, an electromagnetic clutch for transmitting a turning force of a first rotor rotated by power from outside to a rotational axis of a driven device is provided with an armature plate arranged oppositely to the first rotor in the axial direction, an electromagnetic coil for attracting the armature plate to the first rotor side, a second rotor for transmitting the turning force transmitted from the armature plate side to the rotational axis of the driven device, a plate spring formed by overlapping a plurality of spring members each other, and the plate spring in which one end side is connected to the second rotor and the other end side is connected to the armature plate, and an inclined portion which is formed by bending apart of the plate spring to the first rotor side, and the inclined portion applies a pressing force to the armature plate directing toward the first rotor when the turning force is transmitted from the armature plate to the second rotor through the plate spring.

By this, said part of the plate spring is a bent portion, and the plate spring is formed by overlapping a plurality of spring members each other. Therefore, even if a force in the direction away from the first rotor acts on the bent portion by the reaction of the pressing force, a stress is generated at each of the plate spring. Thus, compression deformation inward in the bending direction and tension deformation outward in the bending direction of each of the spring members is made smaller than the case where the bent portion is formed by a single plate spring. That is, the stress concentrating in the bent portion is alleviated. Therefore, no deformation or strength drop is generated in the plate spring even after use for a long time, and durability of the plate spring can be improved.

The above and other objects, features, and advantages of the present invention will become more apparent from the following description and the accompanying drawings.

DESCRIPTION OF THE PREFERRED EMBODIMENTS

Figure 1:
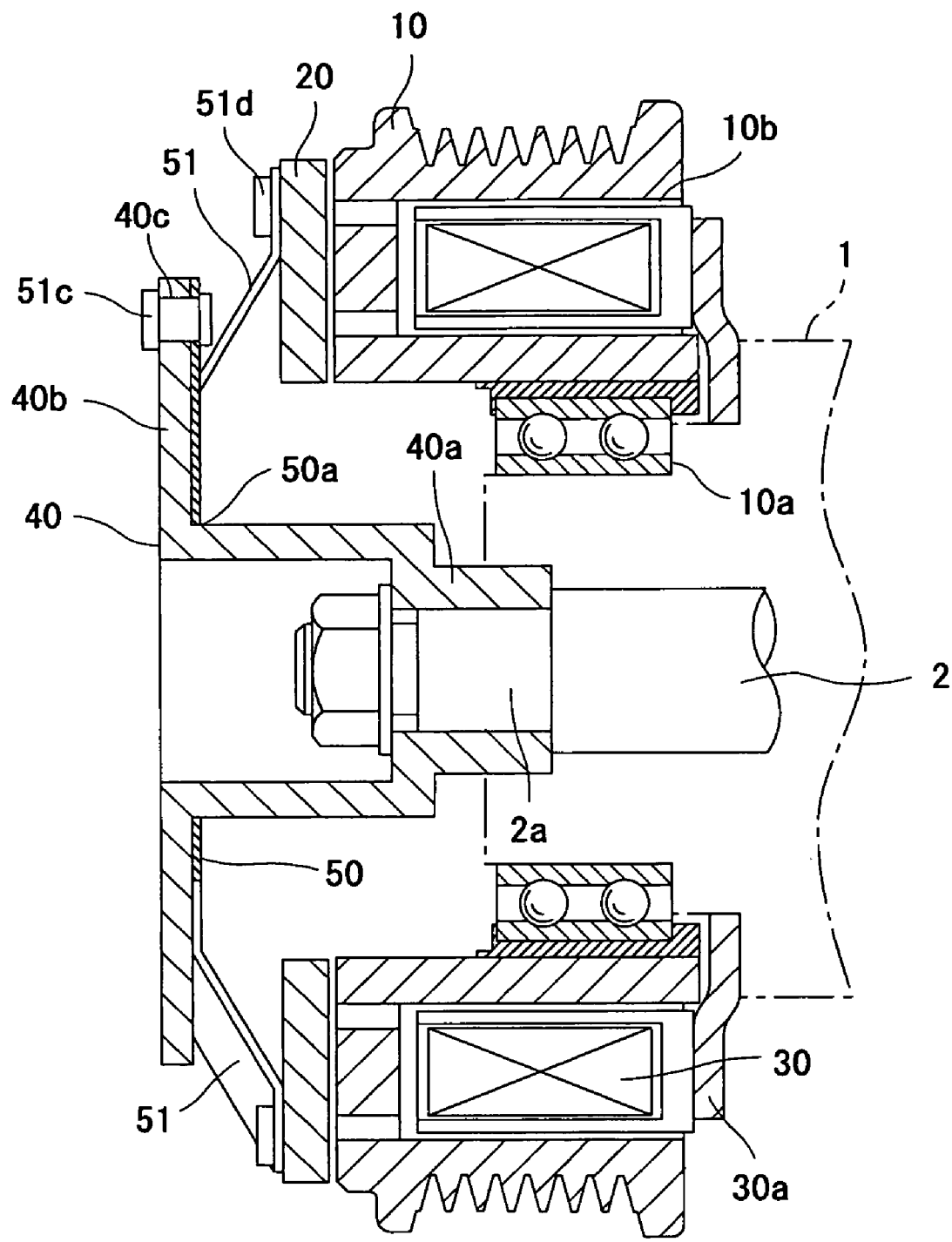
FIG. 1 is a side sectional view of an electromagnetic clutch showing a preferred embodiment of the present invention.
Figure 2:
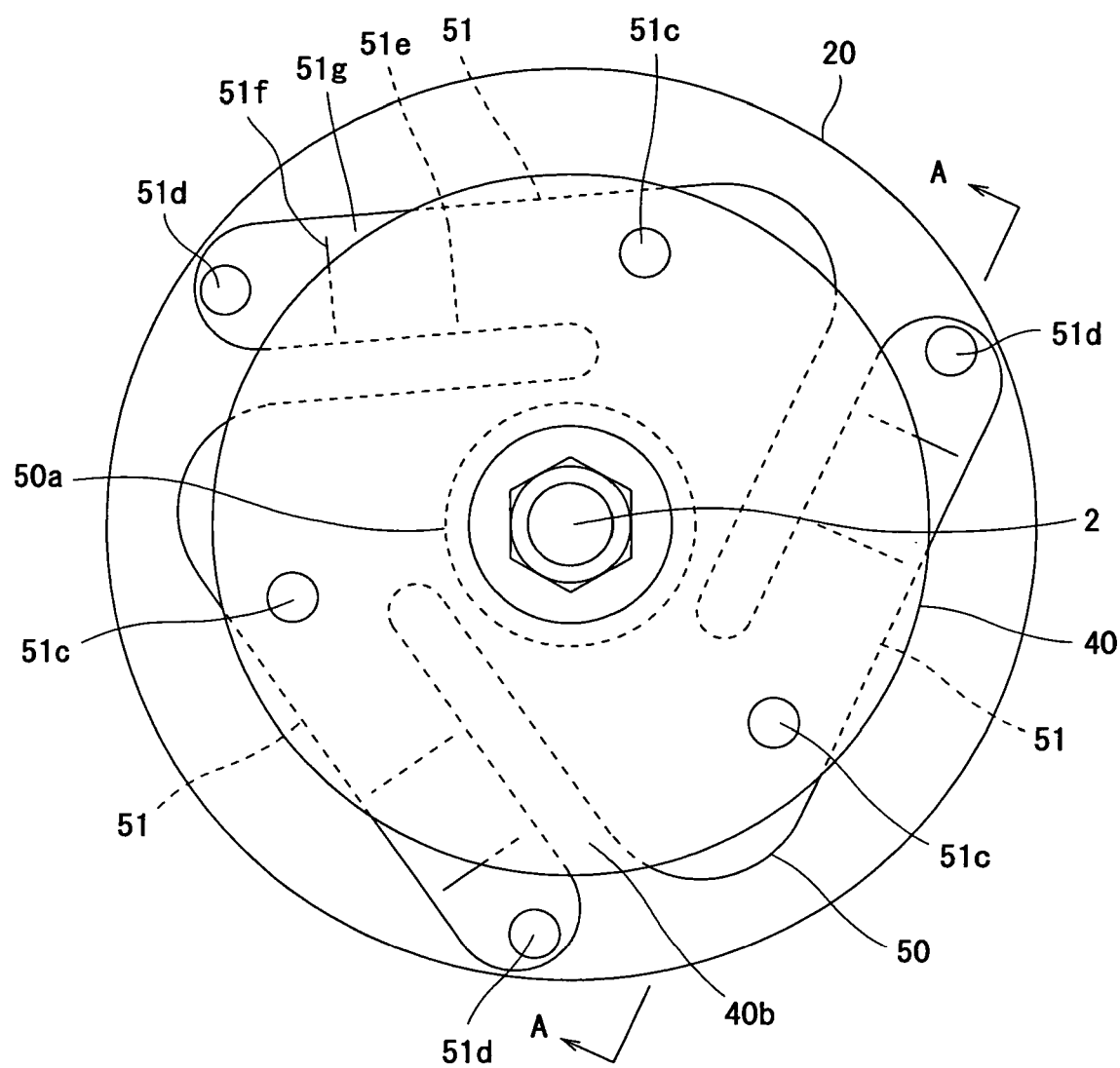
FIG. 2 is a front view of the electromagnetic clutch.
Figure 3:
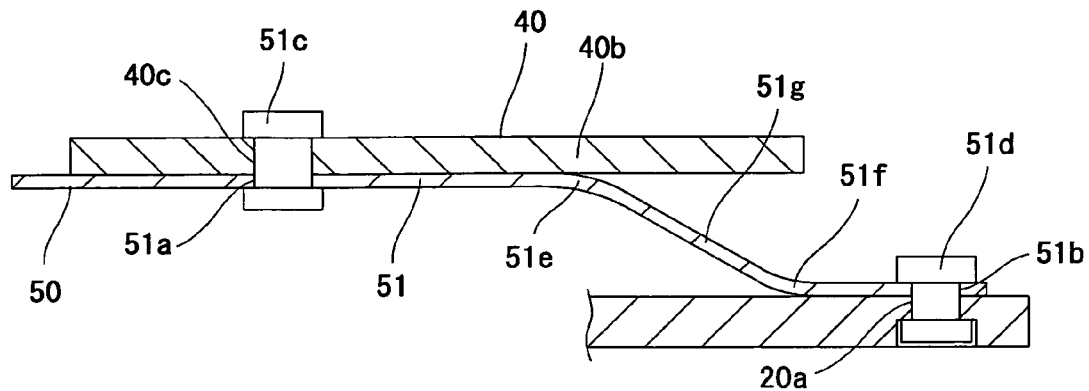
FIG. 3 is a sectional view on A-A line in FIG. 2.
Figure 4:
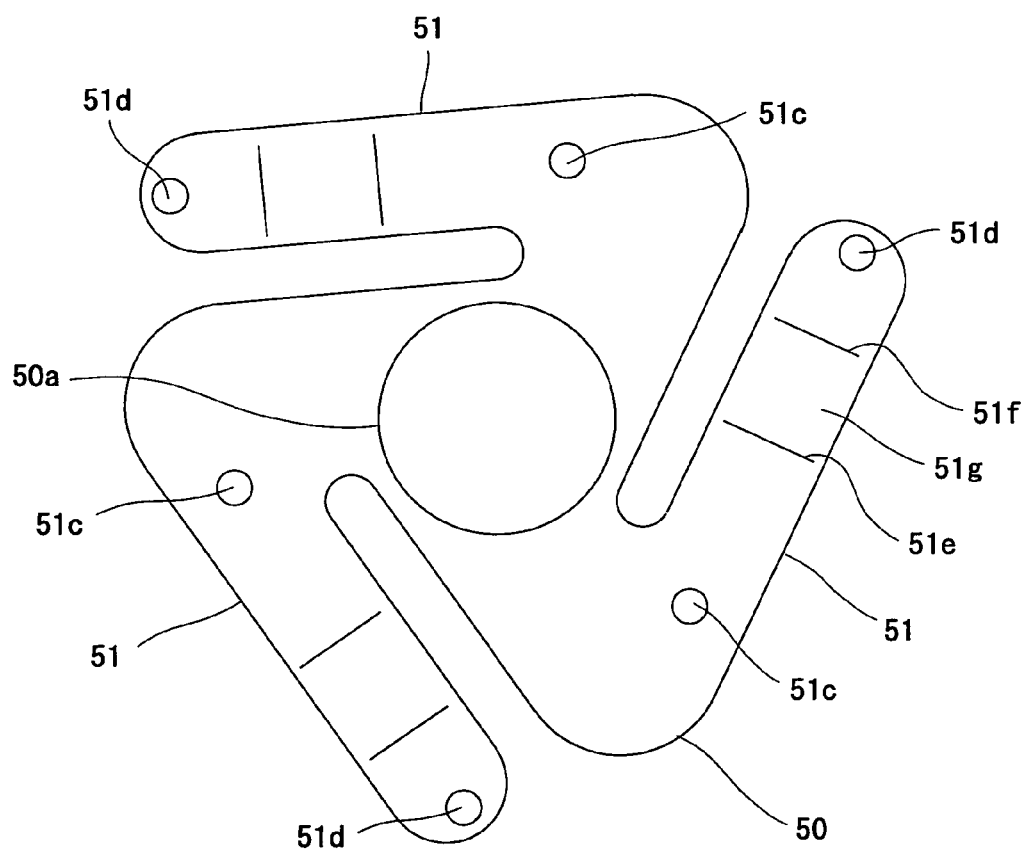
FIG. 4 is a front view of a plate with spring.

FIGS. 1 to 4 show an embodiment of the present invention. FIG. 1 is a side sectional view of an electromagnetic clutch, FIG. 2 is a front view of the electromagnetic clutch, FIG. 3 is a sectional view on A-A line in FIG. 2, FIG. 4 is a front view of a plate with spring.

An electromagnetic clutch of this preferred embodiment is provided with a first rotor 10 to which power from an engine, not shown, is transmitted, an armature plate 20 arranged oppositely to one end face of the first rotor 10 in the axial direction, an electromagnetic coil 30 for attracting the armature plate 20 to the first rotor 10 side, a second rotor 40 for transmitting the turning force transmitted from the armature plate 20 side to a rotational axis 2 of a compressor 1, and a plate with spring 50 provided between the armature plate 20 and the second rotor 40.

The first rotor 10 is a known pulley with an outer circumferential face around which a V-belt, not shown, can be wound, and the first rotor 10 is rotatably supported by the compressor 1 through a bearing 10a. An annular groove portion 10b is provided on the other end face of the first rotor 10. The other end face is a surface in the first rotor 10 opposite to the armature plate 20. Within the groove portion 10b, the electromagnetic coil 30 is arranged.

The armature plate 20 is made of a steel material and has a disk shape.

A predetermined gap is provided between the electromagnetic coil 30 and the groove portion 10b of the first rotor 10. The electromagnetic coil 30 is mounted on the compressor 1 through a mounting plate 30a.

On one end face of the second rotor 40 is provided with a projection portion 40a projecting in the axial direction. The one end face is located on the compressor 1 side of the second rotor 40. An inner circumferential surface of the projection portion 40a is engaged with a spline 2a of the rotational axis 2 in the rotating direction. The spline 2a is provided at the tip end of the rotational axis 2. Moreover, a disk-state extension portion 40b with an outer diameter smaller than the armature plate 20 is provided on the other end face side of the second rotor 40. A predetermined gap is provided in the axial direction between the extension portion 40b and the armature plate 20.

The plate with spring 50 is made of a plate-state member of a spring steel, and the plate with spring 50 has three plate springs 51 on its outer circumferential face side. Each of the plate springs 51 is arranged with an equal interval in the circumferential direction of the plate with spring 50. At the center of the plate with spring 50 is provided with a hole 50a through which the projection portion 40a of the second rotor 40 can be inserted. Each of the plate springs 51 extends in the direction opposite to the rotating direction of the first rotor from the outer circumferential face side of the plate with spring 50. A first mounting hole 51a is provided on one end side of each of the plate springs 51. On the other end side of each of the plate springs 51 is provided with a second mounting hole 51b. Each of the first mounting holes 51a is mounted to a mounting hole 40c provided on the second rotor 40 with a rivet 51c, and each of the second mounting holes 51b is mounted on a mounting hole 20a provided on the armature plate 20 with a rivet 51d. Approximately at the center of each of the plate springs 51 is provided with a first bent portion 51e bent to the first rotor 10 side. Also, a second bent portion 51f bent to the second rotor 40 side is provided on the second mounting hole 51b side of each of the plate springs 51. That is, an inclined portion 51g is formed, which is inclined from the first bent portion 51e toward the second bent portion 51f on the first rotor 10 side. And the extension portion 40b is brought into contact with each of the first bent portion 51e from the direction opposite to the first rotor 10. That is, the extension portion 40b corresponds to a contact portion described in claims.

In the above electromagnetic clutch, when a predetermined electric current flows through the electromagnetic coil 30, the armature plate 20 is attracted to one end face of the first rotor 10 against an urging force of each of the plate springs 51. When the armature plate 20 is attracted to the first rotor 10, the armature plate 20 is rotated together with the first rotor 10. By this, a turning force is transmitted from the armature plate 20 to the second rotor 40 through each of the plate springs 51. That is, the rotational axis 2 of the compressor 1 is rotated.

Here, each of the plate springs 51 extends in the direction opposite to the rotating direction of the first rotor 10 from the outer circumferential face side of the plate with spring 50. Each of the plate springs 51 has one end side mounted on the second rotor 40 and the other end side on the armature plate 20. Therefore, when the turning force is transmitted from the armature plate 20 to the second rotor 40, a compression force is applied between the one end side and the other end side of each of the plate springs 51. And the inclined portion 51g is provided between the one end side and the other end side of each of the plate springs 51. By this, a part of the compression force applied to each of the plate springs 51 acts as a pressing force for pressing the armature plate 20 to the first rotor 10 side. That is, a connecting force between the armature plate 20 and the first rotor 10 is increased by each of the plate springs 51. Thus, a torque capacity which can be transmitted between the armature plate 20 and the first rotor 10 can be increased without requiring enlargement of the electromagnetic coil 30.

Also, a force in the direction away from the first rotor 10 acts on the first bent portion 51e by reaction of the pressing force for pressing the armature plate 20. However, the extension portion 40b of the second rotor 40 is brought into contact with the first bent portion 51e from the direction opposite to the first rotor 10. Thus, a stress generated in the first bent portion 51e of the plate spring 51 is dispersed to the extension portion 40b side. Also, the first bent portion 51e is not deformed in the direction away from the first rotor 10. That is, the stress concentrating on the first bent portion 51e is alleviated.

Moreover, a force in the direction away from the first rotor 10 acts on the first bent portion 51e by the reaction of the pressing force for pressing the armature plate 20. However, the extension portion 40b of the second rotor 40 is brought into contact with the first bent portion 51e from the direction opposite to the first rotor 10. Therefore, deformation of the first bent portion 51e in the direction away from the first rotor 10 is regulated. Thus, the pressing force generated by the inclined portion 51g acts on the armature plate 20 without being decreased by deformation of the first bent portion 51e.

In this way, in the electromagnetic clutch of this preferred embodiment, the stress concentrating on the first bent portion 51e of each of the plate springs 51 is alleviated. Therefore, deformation or strength drop is not generated in each of the plate springs 51 even in use for a long time, and durability of each of the plate springs 51 can be improved.

Also, the pressing force generated by the inclined portion 51g acts on the armature plate 20 without being decreased by deformation of the first bent portion 51e. Therefore, the connecting force between the armature plate 20 and the first rotor 10 can be surely increased by each of the plate springs 51. That is, it is extremely advantageous in increasing the torque capacity which can be transmitted between the armature plate 20 and the first rotor 10.

An electromagnetic clutch provided with three plate springs 51 is shown in this preferred embodiment. However, it is possible to provide two plate springs on the electromagnetic clutch and it is also possible to provide four or more plate springs 51.

Figure 5:
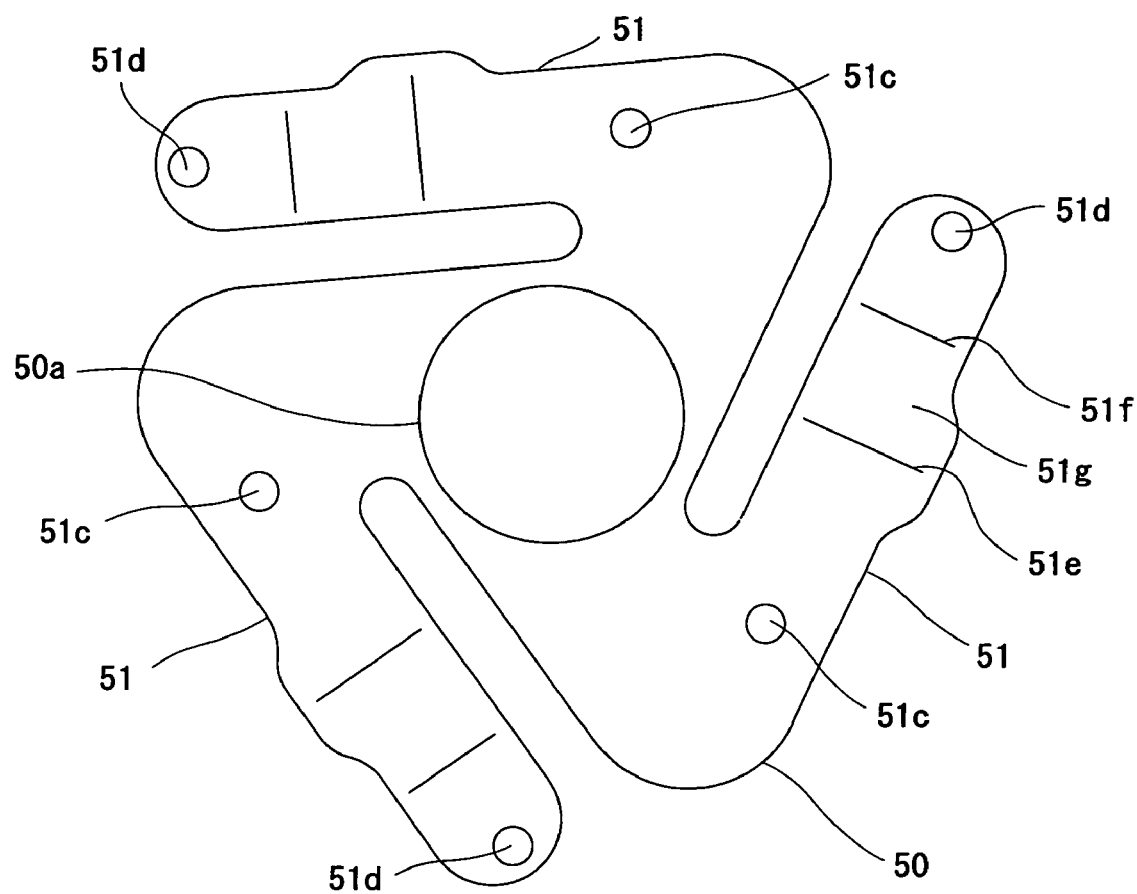
FIG. 5 is a front view of the plate with spring showing a first variation of this preferred embodiment.

In this preferred embodiment, an example formed so that the plate spring 51 has a uniform width dimension between the one end side and the other end side is shown. However, it is possible to form a vicinity of the first bent portion 51e wider than the other portion of the plate spring 51 (See FIG. 5). By this, the first bent portion 51e has a sectional area larger than the other portion of the plate spring 51. Therefore, a stress generated in the first bent portion 51e is dispersed by the larger sectional area, and the stress concentrating on the first bent portion 51e is further alleviated. By this, even if the extension portion 40b is not brought into contact with the first bent portion 51e, a deformation amount that the first bent portion 51e is deformed in the direction away from the first rotor 10 is suppressed. Also, the stress generated in the first bent portion 51e is dispersed by the larger sectional area. That is, even if the contact member is not brought into contact with the first bent portion 51e in the direction opposite to the first rotor 10, the stress concentrating on the first bent portion 51e is alleviated.

Figure 6:
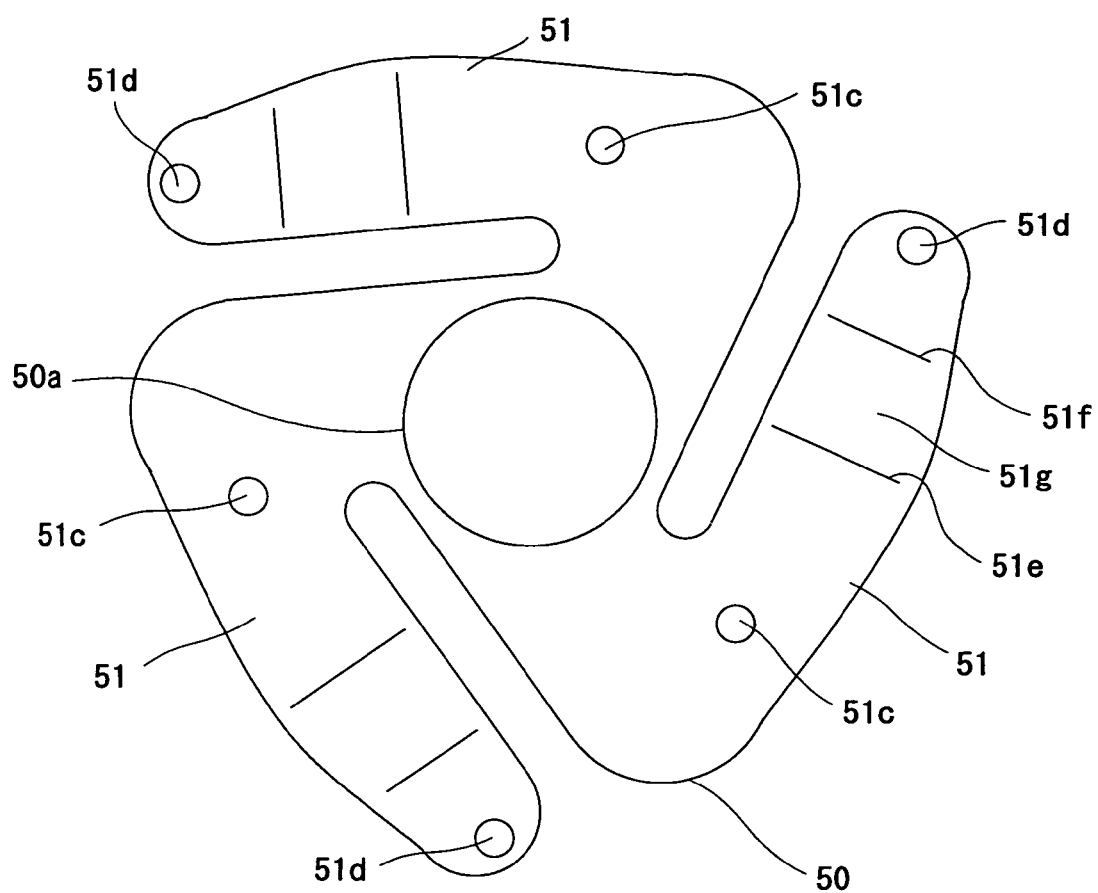
FIG. 6 is a front view of the plate with spring showing a second variation of this preferred embodiment.

Also, it is possible to form one side of the plate spring 51 in the width direction in the arc state so that the vicinity of the first bent portion 51e has a sectional area larger than the other portion of the plate spring 51 (See FIG. 6).

Figure 7:
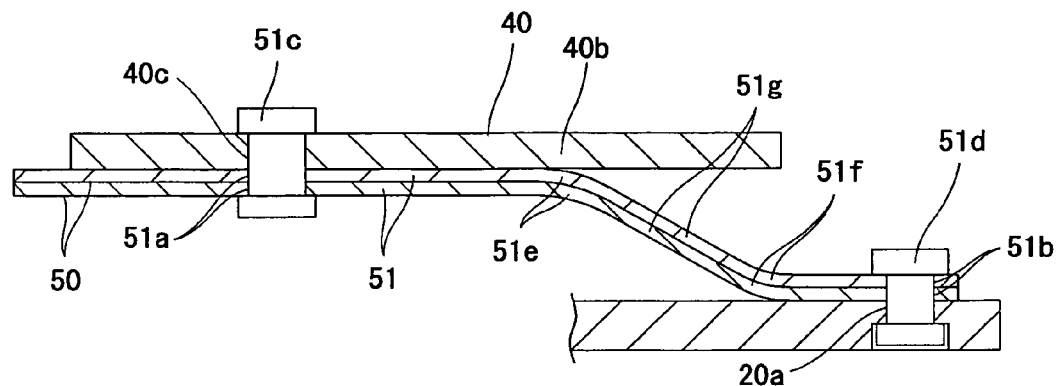
FIG. 7 is a side sectional view of an essential part showing a third variation of this preferred embodiment.
Figure 8:
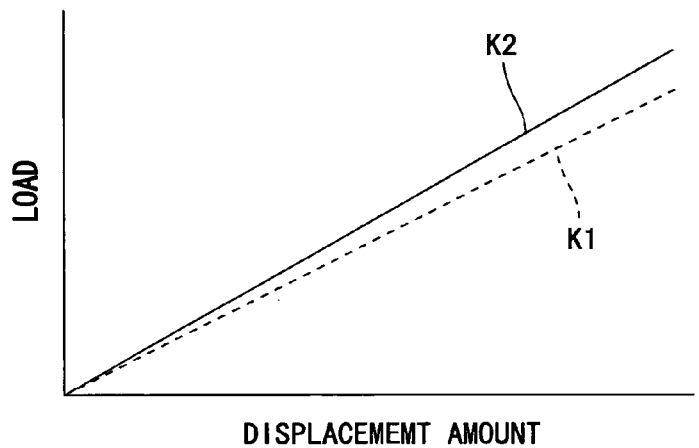
FIG. 8 is a graph showing experiment results of the third variation of this preferred embodiment.

In this preferred embodiment, a single plate with spring 50 is provided between the armature plate 20 and the second rotor 40. However, it is possible to overlap another plate with spring 50 on the face of the plate with spring 50 on the first rotor 10 side (See FIG. 7). By this, it is worried that the urging force by each of the plate springs 50 becomes large. FIG. 8 is an experiment result of measurement of the relations between a displacement amount of the armature plate 20 and a load with respect to the second rotor 40. Referring to FIG. 8, a difference between a measurement result K1 in the case of a single plate with spring 50 and a measurement result K2 in the case of two plates with spring 50 is slight. That is, an increase in the urging force caused by overlapping of the plates with spring 50 is slight and it is not necessary to increase an attracting force by enlarging the electromagnetic coil 30. Also, when the plate springs 51 are overlapped each other, the stress generated in the bent portion 51e on one of the plate springs 51 is dispersed to the other overlapped plate spring 51. Therefore, the stress concentrating on the first bent portion 51e is further alleviated. That is, even if the extension portion 40b is not brought into contact with the first bent portion 51e, the deformation amount that the bent portion 51e is deformed in the direction away from the first rotor 10 is suppressed by the amount of overlapping of the plate springs 51. Also, the stress generated in the first bent portion 51e of one of the plate springs 51 is dispersed to the other overlapped plate spring 51. That is, even if the contact member is not brought into contact with the first bent portion 51e from the direction opposite to the first rotor 10, the stress concentrating on the first bent portion 51e is alleviated.

Figure 9:
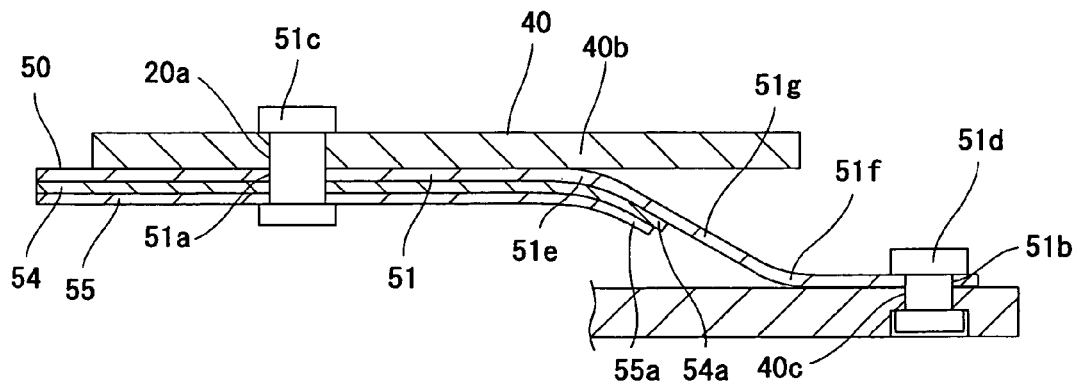
FIG. 9 is a side sectional view of an essential part showing a fourth variation of this preferred embodiment.

In this preferred embodiment, a single plate with spring 50 is provided between the armature plate 20 and the second rotor 40. However, it is possible to overlap a first reinforcing plate 54 and a second reinforcing plate 55 on the first rotor 10 side of the plate with spring 50 (See FIG. 9). Each of the reinforcing plates 54 and 55 has the thickness equivalent to the plate with spring 50. Each of the reinforcing plates 54 and 55 is formed conforming to the plate with spring 50. Each of the reinforcing plates 54 and 55 is provided with plate springs for reinforcement 54a and 55a. Each of the plate springs for reinforcement 54a and 55a is formed shorter than the plate spring 51. Here, each of the plate springs for reinforcement 54a and 55a extends to the middle of the inclined portion 51g of the plate spring 51, and each of the plate springs 51, 54a and 55a is bonded to each other by welding or the like. By this, a stress generated in the first bent portion 51e of the plate spring 51 is dispersed to each of the plate springs for reinforcement 54a and 55a. That is, the stress concentrating on the first bent portion 51e is further alleviated. Even if the extension portion 40b is not brought into contact with the first bent portion 51e, the deformation amount that the first bent portion 51e is deformed in the direction away from the first rotor 10 is suppressed by the amount of overlapping each of the plate springs for reinforcement 54a and 55a on the plate spring 51. Also, the stress generated in the first bent portion 51e is dispersed to each of the plate springs for reinforcement 54a and 55a. That is, even if the contact member is not brought into contact with the first bent portion 51e from the direction opposite to the first rotor 10, the stress concentrating on the first bent portion 51e is alleviated.

Figure 10:
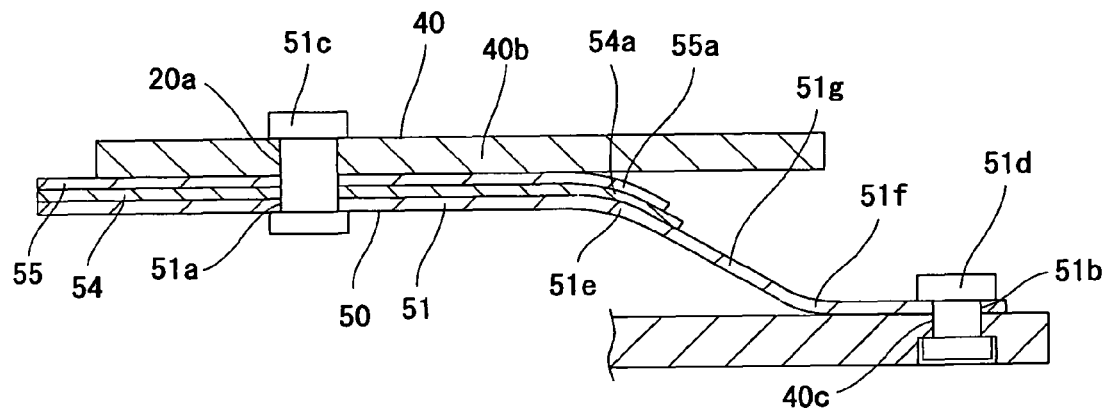
FIG. 10 is a side sectional view of an essential part showing a fifth variation of this preferred embodiment.

It is also possible to overlap each of the reinforcing plates 54 and 55 on the face side of the plate with spring 50 opposite to the first rotor 10 (See FIG. 10). Even if each of the plate springs 51, 54a and 55a is not bonded to each other, the stress generated in the first bent portion 51e of the plate spring 51 is dispersed to each of the plate springs for reinforcement 54a and 55a. Also, the deformation of the first bent portion 51e in the direction opposite to the first rotor 10 is regulated by each of the plate springs for reinforcement 54a and 55a. By this, the stress concentrating on the first bent portion 51e is alleviated.

Figure 11:
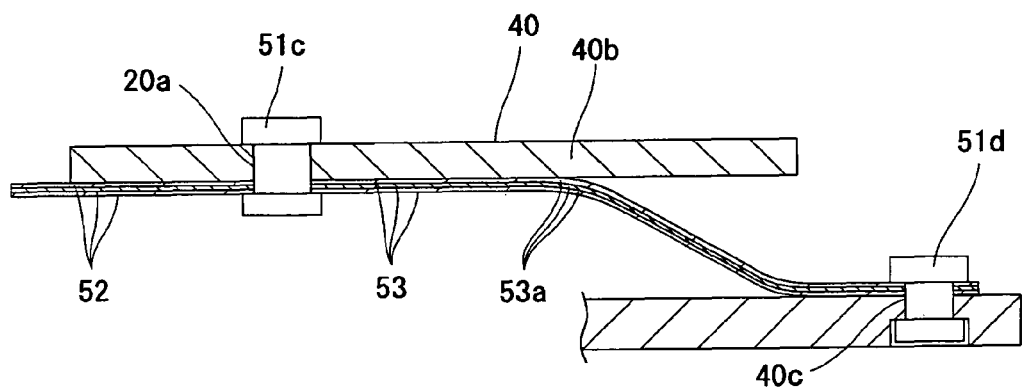
FIG. 11 is a side sectional view of an essential part showing a sixth variation of this preferred embodiment.
Figure 12:
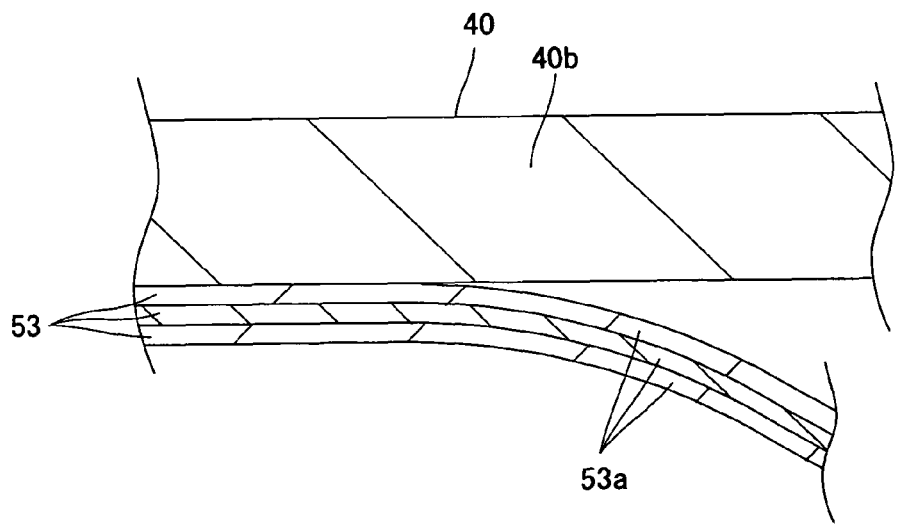
FIG. 12 is a side sectional view of an essential part showing a sixth variation of this preferred embodiment.
Figure 13:
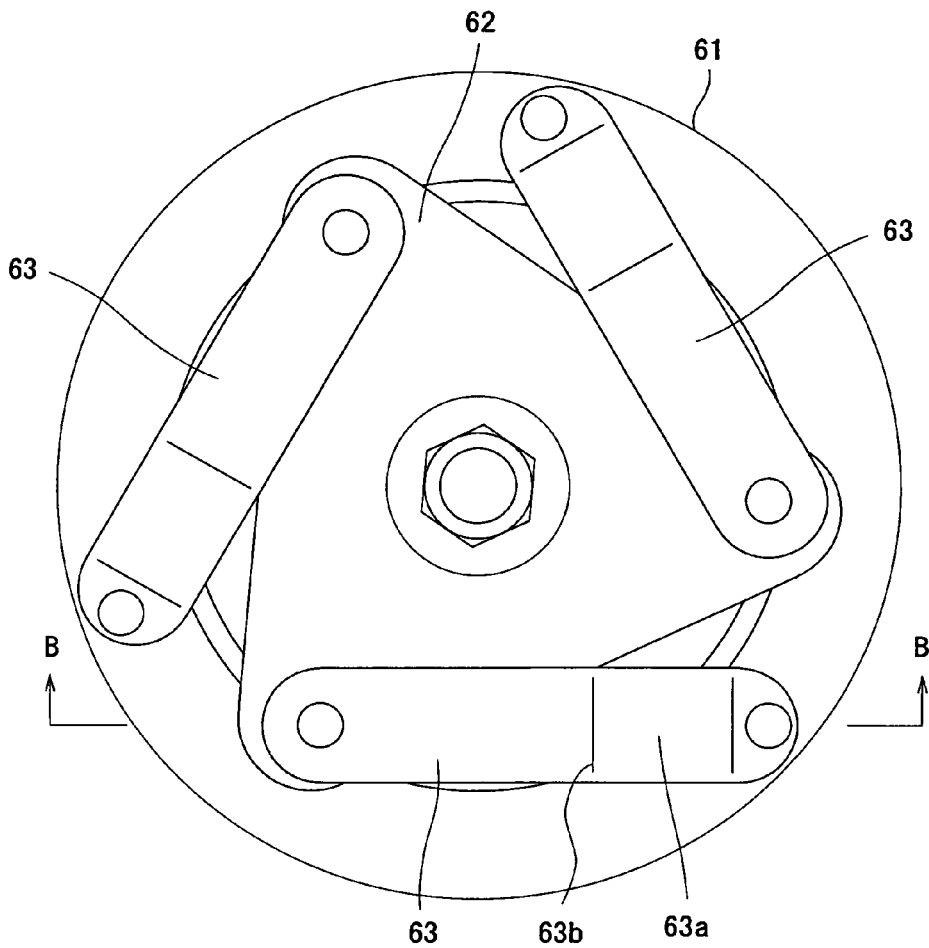
FIG. 13 is a front view of a conventional electromagnetic clutch.
Figure 14:
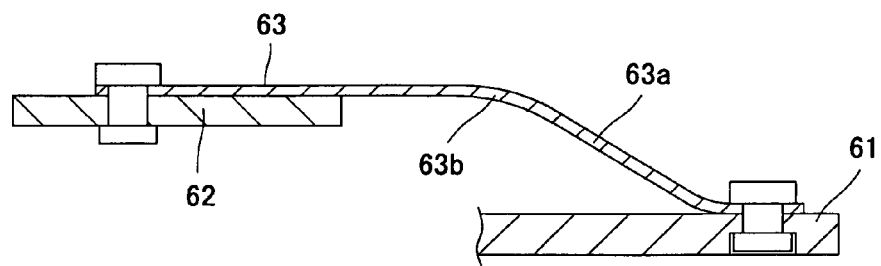
FIG. 14 is a sectional view on B-B line in FIG. 13.
Figure 15:
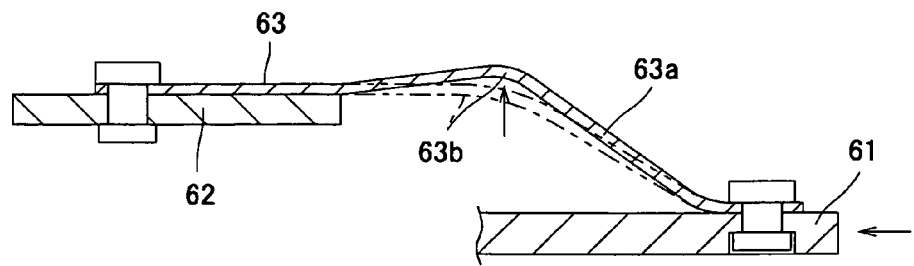
FIG. 15 is a side sectional view of an essential part of the conventional electromagnetic clutch when a turning force is transmitted from the armature plate to a second rotor.

In this preferred embodiment, a single plate with spring 50 is provided between the armature plate 20 and the second rotor 40. However, it is possible to provide three plate with springs 52 having the same shape as the plate with spring 50 (See FIGS. 11 and 12) in place of the plate with spring 50. Each of the plate with springs 52 has the thickness of one third of that of the plate with spring 50. The thickness of each of the plate with springs 52 in which three plate springs 53 are overlapped has the thickness equivalent to that of the plate spring 51. Therefore, even if a force in the direction away from the first rotor 10 acts on a bent portion 53a of each of the plate springs 53 by reaction of the pressing force for pressing the armature plate 20 onto the first rotor 10 side, a stress is generated in each of the plate springs 53 individually. Therefore, when compared with the bent portion 51e of the single plate spring 51, a compression deformation of each of the plate springs 53 inward in the bending direction and a tension deformation outward in the bending direction are small. That is, the stress concentrating on the bent portion 53a of each of the plate springs 53 is further alleviated. Thus, even if the contact member is not brought into contact with the bent portion 53a from the direction opposite to the first rotor 10, the deformation in the bent portion 53a inward in the bending direction and outward in the bending direction is small as compared with the case formed by a single plate spring 51 when the bent portion 53a is deformed in the direction opposite to the first rotor 10. That is, the stress concentrating on the bent portion 53a of each of the plate springs 53 is alleviated.

The preferred embodiments described in this specification are illustrative and not restrictive. The scope of invention is given by the appended claims, and all changes and modifications included in the meaning of claims are embraced in the present invention.

What is claimed is:

1. An electromagnetic clutch for transmitting a turning force of a first rotor rotated by a power from outside to a rotational axle of a driven device, the electromagnetic clutch comprising:

an armature plate arranged oppositely to the first rotor in the axial direction;

an electromagnetic coil for attracting the armature plate to the first rotor side;

a second rotor for transmitting the turning force transmitted from the armature plate side to the rotational axle of the driven device;

a plate spring in which one end side is connected to the second rotor and the other end side is connected to the armature plate, and the plate spring having a strip-shaped part extending between a first connected part at said one end side and a second connected part at said other end side, the length of the strip-shaped part in the extending direction is greater than the width of the strip-shaped part in a direction perpendicular to the extending direction, the strip-shaped part comprises a wide portion located at a middle of the strip-shaped part in the extending direction; and an inclined portion configured by bending said wide portion of the strip-shaped part toward the electromagnetic coil to form a first bent portion and by bending a narrow portion of the strip-shaped part away from the electromagnetic coil to form a second bent portion, wherein said narrow portion is located at a radially outer position relative to said wide portion and a first axial distance between the first bent portion and the electromagnetic coil is greater than a second axial distance between the second bent portion and the electromagnetic coil, wherein the narrow portion is less than the wide portion in the perpendicular direction, and wherein the first bent portion has a concave shape with respect to the electromagnetic coil and the second bent portion has a convex shape with respect to the electromagnetic coil.

2. An electromagnetic clutch for transmitting a turning force of a first rotor rotated by a power from outside to a rotational axle of a driven device, the electromagnetic clutch comprising:

an armature plate arranged oppositely to the first rotor in the axial direction;

an electromagnetic coil for attracting the armature plate to the first rotor side;

a second rotor for transmitting the turning force transmitted from the armature plate side to the rotational axle of the driven device;

a first plate spring in which a first end is connected to the second rotor and a second end is connected to the armature plate;

an inclined portion configured by bending a part of the plate spring toward the electromagnetic coil, the inclined portion is located between said first and second ends of the first plate spring; and a second plate spring overlapping the first plate spring from a direction opposite to the first rotor, wherein the second plate spring extends from a connection portion between the second rotor and the first plate spring to a middle of the inclined portion, the second plate spring is connected to the second rotor and is not connected to the armature plate.

3. An electromagnetic clutch for transmitting a turning force of a first rotor rotated by a power from outside to a rotational axle of a driven device, the electromagnetic clutch comprising:

an armature plate arranged oppositely to the first rotor in the axial direction;

an electromagnetic coil for attracting the armature plate to the first rotor side;

a second rotor for transmitting the turning force transmitted from the armature plate side to the rotational axle of the driven device;

a plate spring in which a first end side is connected to the second rotor and a second end side is connected to the armature plate, and the plate spring comprises a strip-shaped part extending between a first connected part at the first end side and a second connected part at the second end side, the length of the strip-shaped part in the extending direction is greater than the width of the strip-shaped part in a direction perpendicular to the extending direction, the strip-shaped part comprises a wide portion located at a middle of the strip-shaped part in the extending direction; and an inclined portion configured by bending said wide portion of the strip-shaped part toward the electromagnetic coil to form a first bent portion and by bending a narrow portion of said strip-shaped part away from the electromagnetic coil to form a second bent portion, wherein said narrow portion of said strip-shaped part is located at a radially outer position relative to said wide portion, wherein the narrow portion is less than the wide portion in the perpendicular direction, the wide portion and the narrow portion are located between the first connected part at the first end side and the second connected part at the second end side, the wide portion has a concave shape with respect to the electromagnetic coil and the narrow portion has a convex shape with respect to the electromagnetic coil, and the plate spring extends in a direction which is inclined to the rotational direction relative to the radial direction and which is opposite to a rotating direction of the first rotor from the first end side to the second end side.

4. An electromagnetic clutch for transmitting a turning force of a first rotor rotated by a power from outside to a rotational axle of a driven device, the electromagnetic clutch comprising:

an armature plate arranged oppositely to the first rotor in the axial direction;

an electromagnetic coil for attracting the armature plate to the first rotor side;

a second rotor for transmitting the turning force transmitted from the armature plate side to the rotational axle of the driven device;

a plate spring in which a first end is connected to the second rotor and a second end is connected to the armature plate;

an inclined portion configured by bending a first part of the plate spring toward the electromagnetic coil to form a first bent portion and by bending a second part of the plate spring away from the electromagnetic coil to form a second bent portion, said second bent portion is located at a radially outer position relative to said first bent portion of the plate spring, the inclined portion and the first bent portion are located between a first connected part at a first end side and a second connected part at a second end side; and a second plate spring overlapping the plate spring from a direction opposite to the first rotor, wherein the second plate spring extends from the first connected part connecting the second rotor and the plate spring to a middle of the inclined portion, the second plate spring is connected to the second rotor and is not connected to the armature plate, the first bent portion has a concave shape with respect to the electromagnetic coil and the second bent portion has a convex shape with respect to the electromagnetic coil, the plate spring extends in a direction which is inclined to the rotational direction relative to the radial direction and which is opposite to a rotating direction of the first rotor from the first end side to the second end side.

* * * * *